(12) United States Patent
Paul

(10) Patent No.: US 8,481,476 B2
(45) Date of Patent: Jul. 9, 2013

(54) POLYOXYALKYLENE AMINOSILICONE-BASED ANTIFOAM AGENT AND ITS PROCESS OF MANUFACTURE

(75) Inventor: Amit Kumar Paul, Kolkata (IN)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/582,643

(22) PCT Filed: Feb. 21, 2011

(86) PCT No.: PCT/EP2011/052510
§ 371 (c)(1),
(2), (4) Date: Sep. 4, 2012

(87) PCT Pub. No.: WO2011/107361
PCT Pub. Date: Sep. 9, 2011

(65) Prior Publication Data
US 2012/0329701 A1  Dec. 27, 2012

(30) Foreign Application Priority Data

Mar. 2, 2010 (IN) .............................. 198/KOL/2010

(51) Int. Cl.
*C11D 9/36* (2006.01)
(52) U.S. Cl.
USPC .......... 510/347; 510/276; 510/317; 510/343; 510/349; 510/438; 510/442; 510/466

(58) Field of Classification Search
USPC ................ 510/276, 317, 343, 347, 349, 438, 510/442, 466
See application file for complete search history.

(56) References Cited

U.S. PATENT DOCUMENTS

| 4,637,890 A | | 1/1987 | Crabtree et al. | |
|---|---|---|---|---|
| 4,894,117 A | | 1/1990 | Bianchi et al. | |
| 5,130,344 A | | 7/1992 | Kollmeier et al. | |
| 5,147,578 A | * | 9/1992 | Kirk | 510/513 |
| 6,326,061 B1 | * | 12/2001 | Lautenschlager et al. | 427/394 |
| 7,294,653 B2 | * | 11/2007 | Zeng | 516/124 |
| 2001/0056059 A1 | * | 12/2001 | Murphy et al. | 510/513 |
| 2009/0036618 A1 | | 2/2009 | Geisberger et al. | |
| 2009/0081146 A1 | * | 3/2009 | Fukuhara et al. | 424/70.1 |

FOREIGN PATENT DOCUMENTS

| DE | 3928867 C1 | 10/1990 |
|---|---|---|
| EP | 0254499 B1 | 9/1993 |
| EP | 0685250 A1 | 12/1995 |
| EP | 0718018 A2 | 6/1996 |
| JP | 59069110 * | 4/1984 |
| JP | 59069110 A | 4/1984 |
| JP | 11158287 A | 6/1999 |
| JP | 2007303016 A | 11/2007 |

* cited by examiner

*Primary Examiner* — Charles Boyer
(74) *Attorney, Agent, or Firm* — Brooks Kushman P.C.

(57) ABSTRACT

Modified aminoalkyl- and polyoxyalkylene-functional organopolysiloxanes exhibit delayed antifoaming activity in washing operations, minimizing foaming of rinse water. When applied to a pulverulent carrier, they may also be used in powder detergent formulations.

20 Claims, No Drawings

POLYOXYALKYLENE AMINOSILICONE-BASED ANTIFOAM AGENT AND ITS PROCESS OF MANUFACTURE

CROSS-REFERENCE TO RELATED APPLICATIONS

This application is the U.S. national phase of PCT Application No. PCT/EP2011/052510 filed Feb. 21, 2011, which claims priority to Indian application 198 KOL/2010 filed Mar. 2, 2010, and to Indian application 198 KOL/2010 filed Mar. 12, 2010 the disclosures of which are incorporated in their entirety by reference herein.

BACKGROUND OF THE INVENTION

1. Field of the Invention

The present invention relates to an antifoam powder exhibiting delayed antifoam activity, and in particular, relates to the preparation of an antifoam powder comprising a modified amino silicone/organopolysiloxane antifoam fluid absorbed in carrier filler. The antifoam powder may be used in laundry detergent formulations, especially in fabric washing, where excellent antifoaming effects are exhibited in the rinsing cycle, while maintaining similar foaming nature in washing cycles compared to detergents without antifoam. The present invention also relates to a process of synthesis of the modified amino silicone/organopolysiloxane-based delay antifoam present in the antifoam powder or antifoam fluid for use in detergent formulations.

Specifically, the present invention is thus directed not only to saving huge amounts of waste water, but also to helping to preserve massive amounts of precious clean water for desirable use and application. Advantageously, therefore the present invention in other words is in the line of green water balance targeted to reduce pollution and save the world from future massive climatic disasters or ecological imbalances.

More specifically, the modified amino silicone or organopolysiloxane in powder form or fluid form can be readily used for diverse applications such as in personal care, especially hair care, home care, textile care, and the like.

2. Description of the Art

In washing processes, water is taken by hand in a bucket or in a fabric soaking container, or in a washing tub in a washing machine. Thereafter, the desired quantity of detergent is added to generate lather by hand shaking or by running for a while in the washing tub. This is followed by immersion of the dirty fabrics for soaking for 10 to 30 min. After a soaking period, the fabric is rubbed by hand to remove dirt or the washing cycle is run for 10 to 20 min in case of machine washing.

For rinsing, the dirty water is drained, and further dirty water is removed by squeezing the fabrics. Thus each such rinsing cycle consists of squeezing the fabrics and washing the fabrics with fresh water. Such rinsing cycles are repeated for four to five times for hand washing or in case of machine washing, four to five rinse cycles are used to remove all foam before final spinning.

It is a traditional perception that the absence of foam in a washing cycle implies that the detergent is not a good one. Thus, all detergent manufacturers have a common requirement of foaming during washing and preferably not foaming during rinsing, for saving cost and water in such kinds of detergent.

Attempts have been made in the past to resolve this problem by a secondary method, called the "single rinse concept", where during the rinsing cycle, a defoamer containing a fabric conditioner is used, the fabric conditioner conditioning the fabric during the rinsing cycle, and in addition destroying all the residual foam. This concept has not been very successful in case of the hand washing process, since the use of fabric conditioner in this class is considered to be a luxury and people of the hand-washing segment use hand washing due to monetary constraints for fabric cleaning.

Considering the waste of water and the formulation cost for normal detergents used in hand wash or machine wash, there has been a need for detergent formulations which, when used for washing fabrics, generates a preferred amount of foaming during the washing cycle without affecting the cleaning nature of the detergent, but also has antifoaming activity in the rinsing cycle so that one or two rinses is/are enough to clean the fabric. It is however extremely difficult to provide for such characteristics in detergent formulations which would favour both the washing and rinsing cycles and make washing of clothes/fabrics more convenient and user friendly apart from taking care of avoiding unnecessary wastage of valuable water and saving the environment from unnecessarily wasting of water in hand wash and/or machine washing. It is also important, that in such an advancement directed to washing formulations adapted for effective washing while avoiding waste of water, the formulations are available at cost-effective rates, since the market is highly price sensitive, and the success of new detergents heavily depends on cost as well.

U.S. Pat. No. 4,637,890 discloses a detergent composition that acts as a defoamer in rinsing cycles. Detergent compositions disclosed therein contain suds/foam-controlling prills comprising fatty acid soap, quaternary ammonium salt and silicone fluid for suds suppression. It is indicated in the patent that the prills do not dissolve in the relatively high pH (from 9 to 10.5 pH) washing cycles, and the prills are not active at high pH. Prills become active to suppress suds at low pH in the rinse cycles where less alkaline detergent is contained in the rinse water. However, the examples do not appear directed to any actual application, and additionally it is not clear whether the detergent was effective in hand washing or machine-assisted hand washing. It is understood from the disclosure that the effectiveness of suppressing foam by the silicone defoamer was highly dependent on prill formation with the help of fatty acid soap and quaternary ammonium compound. According to the disclosure a normal silicone fluid (alkylated polysiloxane) was used as the defoamer where normal silicone defoaming activity was controlled in the washing cycle by way of insolubility of prills at alkaline pH.

U.S. Pat. No. 4,894,117 discloses a composition of agglomerated granules for the delayed release of antifoaming agent in laundry systems. It particularly relates to laundry detergent compositions comprising silicone antifoams adsorbed on a powdered, water soluble carrier selected from modified cellulose carriers, which are subsequently agglomerated into granular form by mixing in the presence of a solvent for the carrier. This prior art discloses a series of granulated laundry additives wherein standard silicone antifoams were encapsulated. These different granulated laundry additives have different silicone antifoam release times depending on the type of cellulose used, and the size of the granules. It is clearly apparent that such encapsulated laundry additives are only suitable for machine washing, and totally unsuitable for hand washing or machine-assisted hand washing, since the time of washing would vary from one user to another, one region to another region and one country to another country. Thus while a detergent composition having laundry additive granules with encapsulated silicone antifoam may be acceptable to one user, it may not be suitable for the requirements of another user due to different washing time where the user can either see no foam in washing cycles due to longer washing time, or more water is used in rinsing cycle due to shorter washing time. This is due to the fact that particular granules used in the detergent for washing would have a fixed time for releasing encapsulated silicones. According to the disclosure conventional silica filled polydimethyl siloxane is used as defoamer to make encapsulated defoamer granules.

EP 254 499 B1 discloses a method for the preparation of a silicone defoamer composition, this method comprising heating a mixture comprising
a blend of organopolysiloxanes (1) and (2),
(3) silanes or their partial hydrolysis condensates or siloxane resins,
(4) finely divided filler, preferably silica,
(5) reaction catalyst, preferably KOH,
(6) compounds like alkylene glycols, polyhydric alcohols, carboxylic acids and their esters, nonionic surfactants, polyoxyethylene anionic surfactants, polyether-modified silicones, nonionic fluorinated surfactants and OH-containing polymeric compounds like hydroxyethylcellulose.
A silicone defoamer composition is obtained by reacting a blend of trimethylsilyl-terminated polydimethylsiloxane and silanol-terminated polydimethylsiloxane with polyoxyethylene-polyoxypropylene copolymers and with silica.

The defoaming activity of the composition is disclosed, but neither the use in a detergent composition is described nor can it be used as a delay defoamer by permitting foaming during the washing stage but inhibiting foaming during rinsing operations.

It is thus apparently clear from the above state of the art that all the prior art relies on encapsulation of silicone or silicone defoamer where both these types of chemicals have strong antifoaming action. The activity of delay antifoam or suppression of suds in rinsing cycles is dependent on many other parameters as discussed above. Therefore, application of such type of available antifoams is only possible in systematic washing systems like machine wash but impossible to work in hand washing or machine-assisted hand washing because of the wide variation of washing habits from one user to another. On the other hand, a product that has delayed antifoam action or suppression of suds in the rinsing cycle of hand washing or machine-assisted hand washing, obviously performs better in an all automated machine washing as well.

SUMMARY OF THE INVENTION

It is thus an object of the invention to provide an antifoam powder composition comprising a modified antifoam amino silicone/organopolysiloxane fluid together with a carrier filler that would easily mix with hand washing detergents or machine washing detergents, having no negative effect on detergency and the preferred foaming nature of the detergent during the wash cycle, while providing for excellent antifoaming activity in the rinse cycle.

Another object of the present invention is directed to providing an antifoam silicone fluid which may be used in a laundry detergent formulation and will save a huge amount of fresh water and reduce the waste of valuable water required in hand washing detergent or machine washing detergent applications for cloth/fabric washing.

Another object of the present invention is directed to a selective provision of an antifoam powder composition comprising modified amino silicone/organopolysiloxane fluid together with carrier filler which may be used in detergent compositions with minimum dosage of powder antifoam incorporation in the detergent formulation directed to effective washing and avoiding wastage of water during the rinsing stage.

Another object of the present invention is directed to synthesizing modified amino silicone/organopolysiloxane-based delay antifoam formulations in a simple way, to optimize the cost of the organopolysiloxane compound to provide minimum impact in the formulation cost of the final detergent.

Yet another object of the present invention is directed to an antifoam powder which may be used in a detergent composition with excellent anti-foaming effect during rinsing while generating preferred foaming in the washing cycle.

Still another object of the present invention is directed to a modified amino silicone/organopolysiloxane in fluid form or in powder form for use in diverse applications such as in personal care, specially hair care, home care, textile care, and the like.

Yet another object of the present invention is directed to an antifoam powder which may be used in a detergent formulation comprising a low effective amount of the powder antifoam composition adapted for making the detergent formulation cost effective.

DETAILED DESCRIPTION OF THE PREFERRED EMBODIMENTS

According to a basic aspect of the invention, there is provided an antifoam powder comprising of
(1) 10 to 35% by weight of a modified amino silicone antifoam fluid of the formula $$XR_2Si(OSiAR)_n(OSiR_2)_mOSiR_2X \qquad (I)$$

where
A is an amino radical of the formula $$-R^1-[NR^2-R^3-]_xNR^2_2$$

or a protonated amino form of the amino radical A
X is R or a polyoxyalkylene group G of the formula $$-R^4-(O-R^5)_y-O-R^6$$

R is a monovalent hydrocarbon radical having from 1 to 18 carbon atoms,
$R^1$ is a $C_1$-$C_{10}$-alkylene radical, preferably a radical of the formula $$-CH_2CH_2CH_2-,$$

$R^2$ is hydrogen or a $C_1$-$C_4$-alkyl radical, preferably hydrogen,
$R^3$ is a $C_1$-$C_{10}$-alkylene radical, preferably a radical of the formula $$-CH_2CH_2-,$$

$R^4$ is a $C_1$-$C_{10}$-alkylene radical, preferably a radical of the formula $$-CH_2CH_2CH_2-,$$

$R^5$ is a $C_1$-$C_4$-alkylene radical, preferably a radical of the formula $-CH_2CH_2-$ or $-CH_2CH_2(CH_3)-$ or mixtures thereof,
$R^6$ is hydrogen or a $C_1$-$C_4$-alkyl radical, preferably hydrogen or a methyl radical, more preferably hydrogen,
n is an integer from 1 to 6, preferably from 1 to 3,
m is an integer from 1 to 200, preferably from 1 to 80,
x is 0 or 1 and
y is an integer from 5 to 20, preferably from 5 to 12, with the proviso that on average from 30 to 60 mol %, preferably 50 mol %, of radicals X are polyoxyalkylene groups G; and (2) 65 to 90% by weight of a carrier filler selected from the group comprising sodium carbonate, sodium sulphate, aluminum silicate, potassium carbonate, potassium sulphate, sodium bicarbonate, potassium bicarbonate and zeolites.

According to another aspect of the invention there is provided a process for preparing the antifoam powder comprising the steps of (i) stirring and drying the carrier filler at a temperature from 100° C. to 150° C.,
(ii) mixing the dried carrier filler with the modified amino silicone antifoam fluid of formula (I) at a temperature from 100° C. to 150° C. and
(iii) cooling and obtaining therefrom the antifoam powder.

According to yet another aspect of the invention there is provided an antifoam silicone fluid adapted for use in fluid/powder based detergent formulations, of the formula $$XR_2Si(OSiAR)_n(OSiR_2)_mOSiR_2X \qquad (I)$$

where
A is an amino radical of the formula

—$R^1$—[$NR^2$—$R^3$—]$_x NR^2_2$ or a protonated amino form of the amino radical A
X is R or a polyoxyalkylene group G of the formula —$R^4$—(O—$R^5$)$_y$—O—$R^6$ R is a monovalent hydrocarbon radical having from 1 to 18 carbon atoms,
$R^1$ is a $C_1$-$C_{10}$-alkylene radical, preferably a radical of the formula —$CH_2CH_2CH_2$—,
$R^2$ is hydrogen or a $C_1$-$C_4$-alkyl radical, preferably hydrogen,
$R^3$ is a $C_1$-$C_{10}$-alkylene radical, preferably a radical of the formula —$CH_2CH_2$—,
$R^4$ is a $C_1$-$C_{10}$-alkylene radical, preferably a radical of the formula —$CH_2CH_2CH_2$—,
$R^5$ is a $C_1$-$C_4$-alkylene radical, preferably a radical of the formula —$CH_2CH_2$— or —$CH_2CH_2(CH_3)$— or a mixture thereof,
$R^6$ is hydrogen or an $C_1$-$C_4$-alkyl radical, preferably hydrogen or a methyl radical, more preferably hydrogen,
n is an integer from 1 to 6, preferably from 1 to 3,
m is an integer from 1 to 200, preferably from 1 to 80,
x is 0 or 1 and
y is an integer from 5 to 20, preferably from 5 to 12, with the proviso that on average from 30 to 60 mol %, preferably 50 mol %, of radicals X are polyoxyalkylene groups G.

Examples of hydrocarbons R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; alkenyl radicals such as the vinyl and ally radicals; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the α- and the β-phenylethyl radicals. Most preferred is the methyl radical.

According to a preferred aspect of the invention the amino radical (A) in formula (I) of the modified silicone antifoam fluid is preferably selected from —$(CH_2)_3NH_2$; —$(CH_2)_3NH(CH_2)_2NH_2$; —$(CH_2)_3NHC_6H_{11}$; —$(CH_2)_3NH(CH_2)_2NHC_6H_{11}$; —$(CH(CH_3)CH_2CH_2)NH_2$; —$(CH(CH_3)CH_2CH_2)NH(CH_2)NH_2$; —$(CH_2)NH_2$; —$(CH_2)NH(CH_2)_2NH_2$; —$(CH(CH_3)CH_2CH_2)NHC_6H_1$; —$(CH(CH_3)CH_2CH_2)NH(CH_2)NHC_6H_1$; —$(CH_2)NHC_6H_{11}$; —$(CH_2)NH(CH_2)_2NHC_6H_{11}$; the protonated amino forms and/or acylated amino forms of the above amino radicals, and most preferably, —$(CH_2)_3NH_2$ and —$(CH_2)_3NH(CH_2)_2NH_2$.

According to another preferred aspect of the invention, the amine number of the modified silicone antifoam fluid of formula (I) is from 0.6 mg of KOH/g of polymer to 2.0 mg of KOH/g of polymer of the silicone fluid of formula (I) and most preferably comprises the amine number is from 1.0 to 1.5. Amine numbers in these ranges have surprisingly been found to optimise the antifoaming nature of the fluid in the rinsing stage.

According to yet another preferred aspect of the invention the polyoxyalkylene group G in formula (I) of the modified silicone antifoam fluid is preferably selected from —$(CH_2)_3$—$(OC_2H_4)_y$—O—$R^6$; —$(CH(CH_3)CH_2CH_2)$—$(OC_2H_4)_y$—O—$R^6$; —$(CH_2)_3$—$(OC_3H_6)_y$—O—$R^6$; $(CH(CH_3)CH_2CH_2)$—$(OC_3H_6)_y$—O—$R^6$; —$CH_2$—$(OC_2H_4)_y$—O—$R^6$; —$CH_2$—$(OC_2H_4)_y$—O—$R^6$; —$CH_2$—$(OC_3H_6)_y$—O—$R^6$ and —$CH_2$—$(OC_3H_6)_y$—O—$R^6$, and the polyoxyalkylen group G is most preferably —$(CH_2)_3$—$(OC_2H_4)_y$—O—$R^6$, where $R^6$ and y have the meanings above.

The antifoam powder can be used in laundry detergent compositions in powder form for machine or hand washing, comprising:

(A) an antifoam powder in an amount of 0.3 to 2.5% by weight relating to the total amount of the laundry detergent composition, the antifoam powder comprising (1) 10 to 35% by weight of the modified amino silicone antifoam fluid of formula (I) and (2) 65 to 90% by weight of a carrier filler selected from the group consisting of sodium carbonate, sodium sulphate, aluminium silicate, potassium carbonate, potassium sulphate, sodium bicarbonate, potassium bicarbonate and zeolite; and
(B) a usual laundry detergent formulation for machine or hand washing.

In still another aspect of the invention there is provided a process for preparing the antifoam silicone fluid comprising:
(I) reacting in a first step
(a) an α,ω-dihydrogen-diorganopolysiloxane of the formula $HR_2SiO$—$(R_2SiO)_p$—$SiR_2H$, and most preferably $H(CH_3)_2SiO$—$((CH_3)_2SiO)_p$—$Si(CH_3)_2H$, with
(b) a polyoxyalkylene compound of the formula $R^{4'}$—(O—$R^5$)$_y$—O—$R^6$, and most preferably $CH_2$=$CH$—$CH_2$—$(OC_2H_4)_y$—O—H
in the presence of
(c) a hydrosilylation catalyst, preferably a platinum catalyst,
(d) where the reaction is optionally carried out under moisture free conditions, preferably in a nitrogen atmosphere, preferably at 60 to 120° C., and preferably with a proper cooling system to control the temperature due to exothermic reaction. Most preferably, reaction is carried out at 80 to 100° C., The products of the first step may optionally be obtained from commercial sources, thus eliminating the need for the first step in the synthesis.

(II) reacting in a second step (e) the resulting hydrosilylation product obtained from step (I) of the formula $$XR_2SiO—(R_2SiO)_p—SiR_2X,$$

and most preferably H—O—$(C_2H_4O)_y$—$(CH_2)_3$—Si$(CH_3)_2$O—$((CH_3)_2SiO)_p$—$(CH_3)_2$Si—$(CH_2)_3$—$(OC_2H_4)_y$—O—H (f) a diorganopolysiloxane of the formula $$HOR_2SiO—(R_2SiO)_s—SiR_2OH,$$

and most preferably HO—$(CH_3)_2$SiO—$((CH_3)_2SiO)_s$—$(CH_3)_2$Si—OH, and (g) an aminoalkyl silane of the formula $$ASiR(OR^7)_2,$$

and most preferably $(CH_3O)_2Si(CH_3)$—$(CH_2)_3$—NH$(C_2H_4)NH_2$, in the presence of (h) a basic catalyst, preferably potassium methoxide or potassium ethoxide, and in the presence of (i) a chain-terminating organopolysiloxane of the formula $$R_3SiO—(R_2SiO)_z—SiR_3,$$

and most preferably $(CH_3)_3SiO$—$((CH_3)_2SiO)_z$—Si$(CH_3)_3$, at a temperature of from 80° C. to 150° C., and then, after the reaction (II)

(III) neutralizing the basic catalyst (h), by addition of a neutralizing agent (j), preferably a triorganosilyl phosphate, more preferably a trimethylsilyl phosphate, where A, X, R, $R^5$, $R^6$, and y have the meanings above and $R^{4'}$ is a $C_1$-$C_{10}$-alkenyl radical having a terminal carbon-carbon double bond, $R^7$ is a $C_1$-$C_4$-alkyl radical, p is an integer from 10 to 25, s is an integer from 20 to 60, z is an integer from 0 to 10.

The step (III) is preferably followed by step (IV) stripping for removing volatiles under vacuum at a temperature between 130 to 200° C. and obtaining the antifoam silicone fluid therefrom.

In Step (I) there are preferably used 40 to 70 mol %, more preferably 50 to 70 mol %, of the α,ω-dihydrogen-diorganopolysiloxane (a) of the formula $$HR^2SiO—(R^2SiO)_p—SiR_2H \text{ and}$$

30 to 60 mol %, more preferably 30 to 50 mol %, of the polyoxyalkylene compound (b) of the formula $$R^{4'}—(O—R^5)_y—O—R^6,$$

wherein R, $R^{4'}$, $R^5$, $R^6$, p and y have the meanings above and wherein the sum of (a) and (b) is 100 mol %.

In Step (II) there are preferably used 2 to 15 parts per weight of the resulting hydrosilylation product (e) obtained from step (I) of the formula $XR^2SiO$—$(R^2SiO)_p$—$SiR_2X$, 60 to 90 parts per weight of the diorganopolysiloxane (f) of the formula $$HOR_2SiO—(R_2SiO)_s—SiR_2OH,$$

8 to 20 parts per weight of the aminoalkyl silane (g) of the formula $ASiR(OR^7)_2$, 0.01 to 2.0 parts per weight of the basic catalyst (h) and 0.1 to 5 parts per weight of the chain-terminating organopolysiloxane (j) of the formula $R^3SiO$—$(R^2SiO)_z$—$SiR^3$, wherein R, $R^7$, A, X, p, s and z have the meanings above.

The amino radicals A in formula (I) can be protonated partially or fully by adding acids to the modified amino silicone antifoam fluid whereby the salt forms of the amino radicals are obtained.

Examples of acids are carboxylic acids, such as those with 3 to 18 carbon atoms, and which can be linear or branched, such as formic acid, acetic acid, propionic acid, butyric acid, pivalic acid, sorbic acid, benzoic acid, salicylic acid.

The acids are preferably used in amounts of from 0.1 to 2.0 mol per 1 mol of amino radical A in the silicone antifoam fluid of formula (I).

Protonated amino radicals A' of the formula

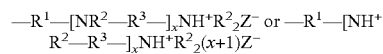

where $Z^-$ is an anion, preferably an anion of a corresponding acid, such as a carboxylate anion, for example an acetate anion, to the $N^+$, and $R^1$, $R^2$, $R^3$ and x have the meanings above, can be obtained.

As discussed hereinbefore the present invention relates to an antifoam powder involving delayed antifoam activity, and in particular, relates to the preparation of an antifoam powder comprising modified antifoam amino silicone/organopolysiloxane fluid absorbed in carrier filler, which can be used in laundry detergent formulations, especially in fabric washing, adapted for excellent antifoaming effect in rinsing cycles while maintaining similar foaming nature compared to detergents without antifoam in the wash cycles.

Advantageously, the detergent composition containing the delayed action antifoam composition is found to have excellent antifoaming effect in the rinsing cycle while providing for preferred foaming effect in the washing cycle.

The present invention also relates to a process of synthesis of the modified amino silicone organopolysiloxane based delay antifoam compound present in the said antifoam powder for use in detergent formulation wherein the silicone compound generates preferred in-situ foaming properties of the detergent formulation in the washing cycle but acts as an antifoam in rinsing cycle.

According to the present invention, performance of powder silicone antifoam compositions comprising the modified silicone fluid/organopolysiloxane is confirmed by a unique mechanism that governs its role as an antifoam agent in rinsing cycles while maintaining preferred amount of foam in washing cycles.

Effective detergent compositions comprise anionic surfactants, particularly alkyl benzene sulfonate and alkyl sulfate surfactants. It has also been found beneficial for the appearance and cleaning of fabrics for laundry detergents to contain an amount of a cellulose enzyme sufficient to improve the appearance and cleaning of such fabrics, particularly after multiple cleaning cycles, but the anionic surfactant is important for cleaning and is an inexpensive source of generating substantial foam in washing, even in small amounts. To improve upon the detergent effect of the laundry detergent formulation, further chemicals are often used, for example complex phosphates, non-ionic surfactants, soap noodles, different inorganic salts and other additives used for optimizing detergency effect.

In detergent powders, the main foaming component is an anionic surfactant. According to the present invention, when laundry detergent containing powder silicone antifoam is dissolved in water, a large amount of foam is generated due to the anionic surfactant and no interaction takes place between the amino groups of the modified silicone fluid and the anionic surfactant due to the presence of high foam in the liquor. As soon as the fabric to be washed contacts the wash liquor, modified amino silicone fluid penetrates inside the fibers due to its high affinity towards the fabric. Due to high lather produced during the wash cycle in machine wash or during rubbing the fabrics in hand wash after soaking, now with the amino silicone fluid absorbed into the fabric, the anionic surfactant cannot come into contact with the amino group of the modified silicone to interact and form a salt. Therefore, the foaming nature of the detergent during prewash or in post wash does not change. In the rinse cycle, residual detergent transfers into fresh water from the fabric after squeezing the fabrics. Therefore, the rinse liquor foam density reduces significantly due to lesser amount of detergent present in the liquor and hence, the anionic surfactant easily reacts with the modified amino silicone penetrated into and attached to the fabric to form water soluble silicone salts which transfer immediately to the rinsing liquor due to the formation of a neutral salt with the anionic surfactant. As a result, the anionic surfactant, now transformed to a salt of the silicone and anionic surfactant thereby loses its foaming nature and hence, foams in the rinse water are eliminated in significant amounts. Specially, in case of hand wash, no foam is observed after 1 to 2 rinses.

It is thus observed according to the present invention, that the antifoam powder, when used in laundry detergent compositions, not only saves water in rinse cycles but also provides for good conditioning effects on the fabric due to residual silicone adhered onto the fabric.

It is further observed, according to the present invention, that the effects of the modified amino silicone/organopolysiloxane fluid, when directly incorporated in a liquid laundry detergent for the purpose of saving water in rinsing cycles during fabric washing by hand or by machine washing are similar to the effects obtained with laundry powder detergents containing the novel powder based antifoam agent, similarly serving the purpose of saving water.

Further according to the present invention, the novel modified amino silicone or organopolysiloxane fluid/powder can be used in personal care i.e. more particularly in hair care applications for conserving water during hair rinsing.

It is also a fact according to the present invention, that the modified amino silicone or organopolysiloxane in powder or fluid form can be used in personal care i.e. more particularly in hair care applications and body wash for conserving water during hair/body washing.

It is another possibility according to the present invention that the modified amino silicone or organopolysiloxane in powder or fluid form can be used in different home care applications like floor cleaners, wash room cleaners besides home laundry and industrial laundry applications, especially for the conservation of water.

It is also made clear according to the present invention that modified amino silicone or organopolysiloxane in powder or fluid form can be used in defoamers or antifoam agents in textile processing or textile treatments/pulp and paper papers and other industrial applications where foaming due to anionic substances is common.

The details of the invention, its nature and objects are explained hereunder in greater detail in relation to the following non-limiting examples.

EXAMPLES

Step-I
Detergent Formulation for Hand Wash: Example without Antifoam Powder
Linear Alkyl benzene sulfonate Salt=14.00 part
Sodium tripolyphosphate=26.40 part
Soda Ash=47.55 part
Sodium Sulphate=4.40 part
Sodium Perborate=6.85 part
Tetra Acetyl Ethylene Diamine=0.5 part
Perfume=0.30 part

Example-1

Step-II: Polymer Synthesis

Into a 10 liter reactor was introduced 5648 g of an 80 mPa·s α,ω-bis-hydroxyl terminated polydimethylsiloxane, 250 g of an α,ω-terminated polyethylene glycol (10 EO), terminated via propylene spacers to a polydimethylsilicone having a polymer MW of approximately 1800, and having 38 mole % polyoxyethylene groups G, and 782 g of gamma-aminoethylaminopropyl (methyl)dimethoxy)silane. The reactor was closed and purged with nitrogen for 30 min. The reactor was equipped with stirring, heating/cooling, and a vertical condenser that could be used for stripping as well as for refluxing. A receiver was connected at the bottom of the condenser. The reactor also had a facility to work under nitrogen atmosphere or under vacuum or under pressure. An accurate temperature controlling system was also installed in the reactor so that reaction could be carried out at the desired temperature. After 30 min of nitrogen purging, the reactor temperature was increased to 130° C. under nitrogen purging. To the reactor was then added 1 g 40% active alcoholic KOH solution and reaction was carried out for 1 hr. The same catalyst addition was twice repeated, and every time, reaction was carried out for 1 hr. Then, 40 g of trimethylsiloxy-terminated dimethyl polysiloxane having viscosity of 10 mPa·s was added and reaction was continued for 2 hr. Again, 2 g KOH solution was added and the reaction was continued for another 2 hr. The fluid was neutralized with 5.0 g of silyl phosphate. The nitrogen purging was ceased, and distillation was carried out under 300 to 500 mm Hg vacuum at 150° C. for removing all volatiles.

The fluid was cooled to room temperature under vacuum after completion of distillation. A clear α,ω-glycol-terminated, amino polydimethyl siloxane was obtained, having a viscosity of 1000 mPa·s at 25° C., an amine number of 1.24, and having 3.3 mol % polyoxyethylene groups G. On average 50 mol % of the radical X, i.e. the terminal groups of the amino polydimethyl siloxane according to formula (I), are polyoxyethylene groups G and 50 mol % of the radical X are radicals R=methyl radicals.

Step-III: Antifoam Compound Formulation

Equipment used: 10 liter volume, Stainless steel plough shear mixer, with one side entry high speed dispersing tool, suitably jacketed for nominal pressure hot water/cold water heating and cooling. All shaft glands were N2 purged. A suitable dust separator was installed at the loading hopper and the mixer was provided with a standard bottom outlet.

To the mixer was added 3.5 kg of commercial grade sodium carbonate powder having an average particle size of 125 μm, and the powder was stirred and heated to 130° C. under N2 purge to dry the powder. After drying the powder for about an hour, the amino silicone fluid of Example 1 was added by means of a metering pump, to ensure uniform dispensing into the stirred mass. The addition of 1.5 kg of above fluid is completed in about 3 hours, while the temperature is maintained at 130° C. Mixing is continued for another hr after fluid addition. The powder is cooled to 40° C. before emptying from the mixer.

Step-IV: Detergent Formulation for Hand Wash: Example with Antifoam Powder
Linear Alkyl benzene sulfonate Salt=14.00 part
Sodium tripolyphosphate=26.40 part
Soda Ash=47.05 part
Sodium Sulphate=4.40 part
Sodium Perborate=6.85 part
Tetra Acetyl Ethylene Diamine=0.5 part
Perfume=0.30 part
Antifoam powder (produced in step III)=0.5 part Step-V: Detergent Formulation for Machine Wash: Example Without Antifoam Powder of the Invention
Linear Alkyl benzene sulfonate Salt=10.00 part
Soap=1.25 part
Lauryl alcohol 7 EO=2.00 part
Sodium tripolyphosphate=26.40 part
Soda Ash=47.9 part
Sodium Sulphate=4.40 part
Enzyme Protease=0.40 part
Sodium Perborate=6.85 part
Tetra Acetyl Ethylene Diamine=0.5 part
Perfume=0.30 part Step-VI: Detergent Formulation for Machine Wash: Example with Antifoam Powder of the Invention
Linear Alkyl benzene sulfonate Salt=10.00 part
Soap=1.25 part
Lauryl alcohol 7 EO=2.00 part
Sodium tripolyphosphate=26.40 part
Soda Ash=47.40 part
Sodium Sulphate=4.40 part
Enzyme Protease=0.40 part
Sodium Perborate=6.85 part
Tetra Acetyl Ethylene Diamine=0.5 part
Perfume=0.30 part
Antifoam powder (produced in step III)=0.5 part Step VII: Performance Evaluation (Hand Wash)
The protocol used for the evaluation of the respective detergent in buckets by hand washing was as below
  a. 24° fH hard water.
  b. fabric to liquor ratio was 1:10.
  c. 4 gpl detergent (gpl=grams per liter).
  d. lathering was performed for 20 sec and the fabrics then immersed into the bucket of water.
  e. washing cycle maintained for 15 min or 30 min and the foam height measured at 5 min or 10 min intervals.
  f. the fabrics were squeezed to 50% weight pick up.
  g. rinsing was done in each case in fresh 24° fH hard water in a ratio of part of rinse water 1 to 7 parts fresh water and then 5 seconds agitation the fabrics were then squeezed to 50% weight pick up and the foam height in bucket was measured.

Step VIII: Performance Evaluation (Machine Wash)
The protocol used for the evaluation of detergent in top load automatic machine
  a. 24° fH hard water.
  b. fabric to liquor ratio was 1:10.
  c. 4 gpl detergent (gpl=grams per liter).
  d. washing cycle maintained for 15 min or 30 min. The top lid of washing machine was opened just before discharging the washing liquor(as soon as top lid opened, m/c stopped in operation automatically) and fabrics were removed by squeezing so that the fabric retained 50% wash liquor. After taking out the fabric, the foam height was measured.
  e. The top lid was closed and the machine run again. As soon as the machine discharged the washing liquor, the top lid of the machine was opened and the fabrics were transferred. The top lid of the machine was closed and immediately the machine was operated for the rinsing cycle. The top lid of the machine was opened just before discharged the $1^{st}$ rinsing liquor. The fabrics were removed by squeezing so that fabrics contained 50% washed liquor. After taking out the fabric, the foam height was measured and noted as the $1^{st}$ rinsing foam height.
  f. The top lid was again closed and repeated as step 'f' for foam height measurement of the $2^{nd}$, $3^{rd}$ & $4^{th}$ rinsings.

TABLE I

Hand washing result

| Sample's name | detergent dosage, gpl | washing time, min | foam height during washing, cm 0 min | 10 min | 20 min | 30 min | Foam height after $1^{st}$ rinse, cm | Foam height after $2^{nd}$ rinse, cm | Foam height after $3^{rd}$ rinse, cm | Foam height after $4^{th}$ rinse, cm |
|---|---|---|---|---|---|---|---|---|---|---|
| Detergent Step I | 4 | 30 | 10.5 | 10.5 | 10 | 9 | 2 | 1.5 | 1 | 0.5 |
| Detergent Step -IV | 4 | 30 | 12 | 10 | 10 | 9 | 0.5 | 0 | — | — |

TABLE II

Machine Wash result

| Sample's name | detergent dosage, gpl | washing time, min | foam height after 30 min washing in cm | Foam height after $1^{st}$ rinse, cm | Foam height after $2^{nd}$ rinse, cm | Foam height after $3^{rd}$ rinse, cm | Foam height after $4^{th}$ rinse, cm |
|---|---|---|---|---|---|---|---|
| Detergent Step - V | 4 | 30 | 11 | 2 | 1.6 | 1.0 | 0.8 |
| Detergent Step - VI | 4 | 30 | 11.5 | 0.8 | 0.2 | 0 | — |

Tables I and II show that the detergent produced in step IV containing 0.5% of the delay antifoam compound of the present invention performed far better in comparison to the conventional Detergent in step I in the rinsing cycle, while in the washing cycle, there was a comparable, preferred foam height in both detergent formulations.

From Tables I and II, it is also clear that the delayed action antifoam powder showed preferred foaming natures in the washing cycle and at the dilution stage of rinsing. Due to less foam, the anionic surfactant penetrates faster in the fabric and reacts with amino groups of the silicone in the fabric. Therefore, the anionic surfactant loses its foaming character and passes into the aqueous phase. On the other hand, in the washing cycle, anionic surfactant cannot penetrate enough, due to the high foam level, to attach itself to the amino groups of silicone polymer and therefore no difference in foam is observed during the washing cycle, either in hand wash or in machine wash. Similar results from machine wash are also observed in table II when detergents are used from those made in steps V and VI.

Therefore, according to the present invention, modification of silicone molecule and use of such modified molecules such as a modified amino silicone/organopolysiloxane in detergent formulations is acceptable to all users globally, with due consideration of different washing habits from one person to another person, from one region to another region, and from one country to another country. Again, we observed from experiment, the newly developed delay antifoam powder according to present invention worked at 0.5% dosage which obviously does not put much impact on the cost of detergent formulation that most importantly helps detergent manufacturer to pass-on the benefits towards whole detergent consumers without increasing the product cost.

It is thus possible by way of the present invention to provide for detergent formulations and the like to favour both washing and rinsing cycles and make washing of clothes/fabrics more convenient and user friendly apart from taking care of avoiding unnecessary waste of valuable water and saving the environment from unnecessary waste of water in hand wash and/or machine washing and the like.

The invention claimed is:

1. An antifoam silicone fluid adapted for use in fluid-based and powder-based detergent formulations, of the formula $$XR_2Si(OSiAR)_n(OSiR_2)_mOSiR_2X \quad (I)$$

where
A is an amino radical of the formula $$-R^1-[NR^2-R^3-]_xNR^2_2$$

or an amino radical of a formula selected from the group consisting of
—(CH$_2$)$_3$NHC$_6$H$_{11}$,
—CH$_2$)$_3$NH(CH$_2$)$_2$NHC$_6$H$_{11}$,
—CH(CH$_3$)CH$_2$CH$_2$)NHC$_6$H$_{11}$
—CH(CH$_3$)CH$_2$CH$_2$)NH(CH$_2$)NHC$_6$H$_{11}$,
—CH$_2$)NHC$_6$H$_{11}$
—(CH$_2$)NH(CH$_2$)$_2$NHC$_6$H$_{11}$, and mixtures thereof
or a protonated or acylated form of the amino radical(s) A, X is R or a polyoxyalkylene group G of the formula $$-R^4-(O-R^5)_y-O-R^6,$$

R is a monovalent hydrocarbon radical having from 1 to 18 carbon atoms,
R$^1$ is a C$_1$-C$_{10}$-alkylene radical,
R$^2$ is hydrogen or a C$_1$-C$_4$-alkyl radical,
R$^3$ is a C$_1$-C$_{10}$-alkylene radical,
R$^4$ is a C$_1$-C$_{10}$-alkylene radical,
R$^5$ is a C$_1$-C$_4$-alkylene radical,
R$^6$ is hydrogen or a C$_1$-C$_4$-alkyl radical,
n is an integer from 1 to 6,
m is an integer from 1 to 200,
x is 0 or 1 and
y is an integer from 5 to 20, with the proviso that on average from 30 to 60 mol %, of radicals X are polyoxyalkylene groups G.

2. The antifoam silicone fluid of claim 1, wherein
R$^1$ is a —CH$_2$CH$_2$CH$_2$— radical,
R$^2$ is hydrogen,
R$^3$ is a —CH$_2$CH$_2$— radical,
R$^4$ is a —CH$_2$CH$_2$CH$_2$— radical,
R$^6$ is hydrogen,
n is from 1 to 3,
m is from 1 to 80,
y is from 5 to 12, and
on average, from 30 to 50 mol % of radicals X are polyoxyalkylene groups G.

3. An antifoam silicone fluid of claim 1 wherein the amino radical(s) (A) is/are selected from the group consisting of
—(CH$_2$)$_3$NH$_2$; —(CH$_2$)$_3$NH(CH$_2$)$_2$NH$_2$;
—(CH$_2$)$_3$NHC$_6$H$_{11}$; —(CH$_2$)$_3$NH(CH$_2$)$_2$NHC$_6$H$_{11}$;
—(CH(CH$_3$)CH$_2$CH$_2$)NH$_2$;
—(CH(CH$_3$)CH$_2$CH$_2$)NH(CH$_2$)NH$_2$; —(CH$_2$)NH$_2$;
—(CH$_2$)NH(CH$_2$)$_2$NH$_2$;
—(CH(CH$_3$)CH$_2$CH$_2$)NHC$_6$H$_{11}$; —(CH(CH$_3$)CH$_2$CH$_2$)NH(CH$_2$)NHC$_6$H$_{11}$;
—(CH$_2$)NHC$_6$H$_{11}$; —(CH$_2$)NH(CH$_2$)$_2$NHC$_6$H$_{11}$, and mixtures thereof,
the amino radicals (A) optionally being protonated or acylated.

4. The antifoam silicone fluid of claim 3, wherein the amino radical(s) (A) is/are selected from the group consisting of —(CH$_2$)$_3$NH$_2$ and —(CH$_2$)$_3$NH(CH$_2$)$_2$NH$_2$, and mixtures thereof.

5. The antifoam silicon fluid of claim 1 wherein the amine number of the modified silicone antifoam fluid of formula (I) is from 0.6 mg of KOH/g of polymer to 2.0 mg of KOH/g of polymer of the silicone fluid of formula (I).

6. The antifoam silicone fluid of claim 4, wherein the amine number is from 1.0 to 1.5.

7. The antifoam silicone fluid of claim 1 wherein the polyoxyalkylene radical G is selected from the group consisting of
—(CH$_2$)$_3$—(OC$_2$H$_4$)$_y$—O—R$^6$; —(CH(CH$_3$)CH$_2$CH$_2$)—(OC$_2$H$_4$)$_y$—O—R$^6$; —(CH(CH$_3$)CH$_2$CH$_2$)—(OC$_3$H$_6$)$_y$—O—R$^6$; —(CH$_2$)—(OC$_2$H$_4$)$_y$—O—R$^6$; —CH$_2$—(OC$_2$H$_4$)$_y$—O—R$^6$; —(CH$_2$)—(OC$_3$H$_6$)$_y$—O—R$^6$, —CH$_2$—(OC$_3$H$_6$)$_y$—O—R$^6$, and mixtures thereof.

8. The antifoam silicone fluid of claim 7, wherein R$^6$ is hydrogen or methyl, and y is an integer from 5 to 12.

9. A process for preparing an antifoam silicone fluid of claim 1 comprising the steps of:
(I) in a first step, reacting
(a) an α,ω-dihydrogen-diorganopolysiloxane of the formula $$HR_2SiO-(R_2SiO)_p-SiR_2H,$$

with
(b) a polyoxyalkylene compound of the formula $$R^{4'}-(O-R^5)_y-O-R^6,$$

in the presence of
(c) a hydrosilylation catalyst,
(d) the reaction optionally carried out under a moisture free nitrogen atmosphere,
(II) in a second step, reacting
(e) a resulting hydrosilylation product obtained from step (I), of the formula $$XR_2SiO-(R_2SiO)_p-SiR_2X,$$

and
(f) a diorganopolysiloxane of the formula $$HOR_2SiO\text{—}(R_2SiO)_s\text{—}SiR_2OH,$$

with
(g) an aminoalkylsilane of the formula $$ASiR(OR^7)_2,$$

in the presence of
(h) a basic catalyst,
and in the presence of
(i) a chain-terminating organopolysiloxane of the formula $$R_3SiO\text{—}(R_2SiO)_z\text{—}SiR_3,$$

at a temperature of from 80° C. to 150° C.,
and then, after the step (II)
(III) neutralizing the basic catalyst (h), by addition of a neutralizing agent (j),
$R^{4'}$ is a $C_1$-$C_{10}$-alkenyl radical having a terminal carbon-carbon double bond,
$R^7$ is a $C_1$-$C_4$-alkyl radical,
p is an integer from 10 to 25,
s is an integer from 20 to 60 and
z is an integer from 0 to 10.

10. The process of claim 9, wherein the polyoxyalkylene compound (b) comprises $CH_2\text{=}CH\text{—}CH_2\text{—}(OC_2H_4)_y\text{—}O\text{—}H$, the diorganopolysiloxane (f) comprises $HO\text{—}(CH_3)_2SiO\text{—}((CH_3)_2SiO_5(CH_3)_2Si\text{—}OH$, the aminoalkylsilane comprises $(CH_3O)_2Si(CH_3)\text{—}CH_2)_3\text{—}NH(C_2H_4)NH_2$, the chain-terminating organopolysiloxane comprises $(CH_3)_3SiO\text{—}((CH_3)_2SiO)_x\text{—}Si(CH_3)_3$, and the neutralizing agent (j) comprises a silylphosphate.

11. An antifoam powder comprising
(1) 10 to 35% by weight of a modified amino silicone antifoam fluid of the formula $$XR_2Si(OSiAR)_n(OSiR_2)_m(OSiR_2X \qquad (I)$$

where
A is an amino radical of the formula $$\text{—}R^1\text{—}[NR^2\text{—}R^3\text{—}]_xNR^2_2$$

or an amino radical of a formula selected from the group consisting of
—$(CH_2)_3NHC_6H_{11}$,
—$(CH_2)_3NH(CH_2)_2NHC_6H_{11}$,
—$(CH(CH_3)CH_2CH_2)NH(CH_2)NHC_6H_{11}$,
—$(CH_2)NHC_6H_{11}$ and
—$(CH_2)NH(CH_2)_2NHC_6H_{11}$, and mixtures thereof,
amino radical A optionally being protonated or acylated
X is R or a polyoxyalkylene group G of the formula $$\text{—}R^4\text{—}(O\text{—}R^5)_y\text{—}O\text{—}R^6$$

R is a monovalent hydrocarbon radical having from 1 to 18 carbon atoms,
$R^1$ is a $C_1$-$C_{10}$-alkylene radical,
$R^2$ is hydrogen or a $C_1$-$C_4$-alkyl radical,
$R^3$ is a $C_1$-$C_{10}$-alkylene radical,
$R^4$ is a $C_1$-$C_{10}$-alkylene radical,
$R^5$ is a $C_1$-$C_4$-alkylene radical,
$R^6$ is hydrogen or an $C_1$-$C_4$-alkyl radical,
n is an integer from 1 to 6,
m is an integer from 1 to 200,
x is 0 or 1, and
y is an integer from 5 to 20,
with the proviso that on average from 30 to 60 mol % of radicals X are polyoxyalkylene groups G; and (2) 65 to 90% by weight of a carrier filler selected from the group consisting of sodium carbonate, sodium sulphate, aluminium silicate, potassium carbonate, potassium sulphate, sodium bicarbonate, potassium bicarbonate, zeolite, and mixtures thereof.

12. The antifoam powder of claim 11 wherein the powder exhibits a delayed antifoaming action in a detergent formulation.

13. The antifoam powder of claim 11, wherein
$R^1$ is a —$CH_2CH_2CH_2$— radical,
$R^2$ is hydrogen,
$R^3$ is a —$CH_2CH_2$— radical,
$R^4$ is a —$CH_2CH_2CH_2$— radical,
$R^6$ is hydrogen,
n is from 1 to 3,
m is from 1 to 80,
y is from 5 to 12, and
on average, from 30 to 50 mol % of radicals X are polyoxyalkylene groups G.

14. The antifoam powder of claim 11 wherein the amino radical (A) is preferably from the group consisting of
—$(CH_2)_3NH_2$;
—$(CH_2)_3NH(CH_2)_2NH_2$;
—$(CH_2)_3NHC_6H_{11}$; —$(CH_2)_3NH(CH_2)_2NHC_6H_{11}$;
—$(CH(CH_3)CH_2CH_2)NH_2$;
—$(CH(CH_3)CH_2CH_2)NH(CH_2)_2NH_2$; —$(CH_2)NH_2$;
—$(CH_2)NH(CH_2)_2NH_2$;
—$(CH(CH_3)CH_2CH_2)NHC_6H_{11}$; —$(CH(CH_3)CH_2CH_2)NH(CH_2)NH_6H_{11}$;
—$(CH_2)NHC_6H_{11}$; —$(CH_2)NH(CH_2)_2NHC_6H_{11}$ and
mixtures thereof, the amino radicals optionally being protonated or acylated.

15. The antifoam powder of claim 14, wherein the amino radical(s) (A) is/are selected from the group consisting of —$(CH_2)_3NH_2$ and —$(CH_2)_3NH(CH_2)_2NH_2$.

16. The antifoam powder of claim 11, wherein the amine number of the modified silicone antifoam fluid of formula (I) is from 0.6 mg of KOH/g of polymer to 2.0 mg of KOH/g of polymer of the silicone fluid of formula (I).

17. The antifoam powder of claim 16, wherein the amine number is from 1.0 to 1.5.

18. The antifoam powder of claim 11, wherein in Formula (I), the polyoxyalkylene radical G is selected from the group consisting of
—$(CH_2)_3$—$(OC_2H_4)_y$—O—$R^6$; $(CH(CH_3)CH_2CH_2)$—$(OC_2H_4)_y$—O—$R^6$;
—$(CH_2)_3$—$(OC_3H_6)_y$—O—$R^6$; —$(CH(CH_3)CH_2CH_2)$—$(OC_3H_6)_y$—O—$R^6$;
—$(CH_2)$—$(OC_2H_4)_y$—O—$R_6$; —$CH_2$—$(OC_2H_4)_y$—O—$R_6$; —$(CH_2)$—$(OC_3H_6)_y$—O—$R^6$;
$CH_2$—$(OC_3H_6)_y$—O—$R^6$, and mixtures thereof.

19. The antifoam powder of claim 18, wherein $R^6$ is hydrogen or methyl, and y is an integer from 5 to 12.

20. A process for preparing an antifoam powder of claim 11 comprising the steps of
(i) stirring and drying a carrier filler at a temperature of from 100° C. to 150° C. to form a dried carrier filler;
(ii) mixing the dried carrier filler with the modified amino silicone antifoam fluid of formula (I) at a temperature of from 100° C. to 150° C. and
(iii) cooling a mixture obtained in step (ii) to obtain an antifoam powder.

* * * * *